United States Patent
Fukushima

(10) Patent No.: US 7,807,943 B2
(45) Date of Patent: Oct. 5, 2010

(54) METHOD OF PRODUCING MOLDING DIE FOR USE IN PRODUCING A CERAMIC HONEYCOMB STRUCTURE BODY

(75) Inventor: Takeshi Fukushima, Hekinan (JP)

(73) Assignee: Denso Corporation, Kariya (JP)

( * ) Notice: Subject to any disclaimer, the term of this patent is extended or adjusted under 35 U.S.C. 154(b) by 390 days.

(21) Appl. No.: 12/068,278

(22) Filed: Feb. 5, 2008

(65) Prior Publication Data

US 2008/0191390 A1     Aug. 14, 2008

(30) Foreign Application Priority Data

Feb. 8, 2007   (JP) .............................. 2007-029574

(51) Int. Cl.
B23K 26/00  (2006.01)
(52) U.S. Cl. .................. 219/121.69; 264/400; 425/467
(58) Field of Classification Search ................. 264/400; 219/121.69; 425/467
See application file for complete search history.

(56) References Cited

U.S. PATENT DOCUMENTS

| | | | |
|---|---|---|---|
| 4,687,433 A | 8/1987 | Osaki et al. | |
| 6,765,174 B2 | 7/2004 | Fukushima et al. | |
| 7,164,098 B2 | 1/2007 | Fukushima et al. | |
| 2004/0219250 A1 * | 11/2004 | Fukushima et al. | 425/467 |
| 2005/0160891 A1 * | 7/2005 | Koch | 83/53 |
| 2007/0221023 A1 | 9/2007 | Yoshida et al. | |

FOREIGN PATENT DOCUMENTS

| | | |
|---|---|---|
| JP | 61-220805 | 10/1986 |
| JP | 10-034627 | 2/1998 |
| JP | 3-137729 | 12/2000 |
| JP | 3137729 | 12/2000 |
| JP | 2002-301581 | 10/2002 |
| JP | 2003-011111 | 1/2003 |
| JP | 2006-110697 | 4/2006 |
| JP | 2006-205182 | 8/2006 |

OTHER PUBLICATIONS

Japanese Office Action dated Jan. 13, 2009, issued in corresponding Japanese Application No. 2007-029574 with English Translation.

* cited by examiner

Primary Examiner—Kat Wyrozebski
Assistant Examiner—Robert J Grun
(74) Attorney, Agent, or Firm—Nixon & Vanderhye, PC

(57) ABSTRACT

In a method of producing a molding die for use in producing honeycomb structure bodies, a reference position is determined as a relative position on a workpiece between a pillar of a high-pressure water jet and a reference hole. The reference hole is penetratingly formed in a workpiece. The outer periphery of the pillar passes through the reference hole without contacting the inner wall and opening edge of the reference hole. A slit groove formation position is aligned with a pillar formation position by relatively shifting the pillar to the workpiece based on coordinate data where the reference position becomes its origin. Each slit groove is formed in the workpiece by supplying the pillar onto the slit groove formation position on the workpiece while irradiating and scanning a laser beam into the pillar of a high-pressure water jet many times along the slit groove formation position on the workpiece.

10 Claims, 7 Drawing Sheets

METHOD OF PRODUCING MOLDING DIE FOR USE IN PRODUCING A CERAMIC HONEYCOMB STRUCTURE BODY

CROSS-REFERENCE TO RELATED APPLICATION

This application is related to and claims priority from Japanese Patent Application No. 2007-29574 filed on Feb. 8, 2007, the contents of which are hereby incorporated by reference.

BACKGROUND OF THE INVENTION

1. Field of the Invention

The present invention relates to a method of producing a molding die for use in producing (such as extruding and molding) honeycomb structure bodies made of ceramic material.

2. Description of the Related Art

A molding die for use in producing, namely, extruding and molding ceramic honeycomb structure bodies made of ceramic material has a plurality of slit grooves arranged in grid-like shape (or lattice shape). There have been proposed various related-art techniques for making such slit grooves on the molding die. In more recent years, a water jet laser slitter or cutting method is known, for example, disclosed in Japanese patent laid open publications No. JP 2002-301581 and No. JP 2003-11111.

On forming the slit grooves by a slit groove formation system equipped with a water jet laser apparatus as a laser machining apparatus, the pillar of a high-pressure water jet is supplied onto a slit groove formation position on a workpiece (as a target die plate material made of a metal plate) and the slit groove formation system irradiates a laser beam into the pillar of the high-pressure water jet. Further, the slit groove formation system equipped with the water jet laser apparatus controls so that the laser irradiation position repeatedly passes several times along the slit groove formation position in order to scan the laser beam on the workpiece The relates-art method carries out the positioning and alignment between the slit groove formation position and the pillar formation position, onto which the pillar of a high-pressure water jet is supplied, by the following manner. At first, a reference mark is formed on the workpiece before initiating the slit groove formation. The slit groove formation system is also equipped with a camera fixed to a nozzle for jetting the pillar of a high-pressure water jet. The camera photographs the reference mark formed on the workpiece. The slit groove formation system aligns the center of the image data obtained by the camera with the reference mark. The nozzle is shifted on the workpiece by a distance between the nozzle and the camera which is determined in advance in order to align the nozzle with the reference mark formed on the workpiece. Following the above process, the nozzle is relatively shifted or moved on the workpiece based on the reference position. The pillar of the high-pressure water jet is then supplied or jetted onto the slit groove formation position on the workpiece.

However, the above alignment manner in the related-art method only has a positioning accuracy of ±50 μm because the position of the reference mark is determined based on the image data obtained by the camera of the slit groove formation system. Although this positioning accuracy is acceptable for a rough forming process and the like, but it is not acceptable for a fine structure forming process such as the slit groove formation process of not more than 100 μm width. In the slit groove formation process, a large amount of error between the formation position of the pillar of the high-pressure water jet corresponding to the slit groove formation position and the irradiation position of the laser light which passes through the pillar of the high-pressure water jet. This causes various problems such as the variations in width and step of the slit grooves formed in the molding die.

For the above reason, it is demanded to develop and provide a method of producing a molding die for use in producing (such as extruding and molding) honeycomb structure bodies made of ceramic material, capable of preventing the occurrence of variations in width and step of the slit grooves formed in the molding die.

SUMMARY OF THE INVENTION

It is an object of the present invention to provide a method of producing a molding die for use in producing (such as extruding and molding) honeycomb structure bodies, where the method is capable of preventing the occurrence of variations in width and step of slit grooves formed in the molding die.

To achieve the above purpose, the present invention provides a method of producing a molding die using a workpiece (as a target die plate material). The molding die is use in producing honeycomb structure bodies. A plurality of slit grooves and a plurality of feed holes communicating with the feed holes are formed in the molding die in lattice arrangement in order to produce honeycomb structure bodies. A raw material of the honeycomb structure body is fed through the feed holes, and extruded and molded to the honeycomb structure body having a honeycomb structure shape. The method has following steps. A reference position is determined as a relative position between a pillar of a high-pressure water jet to be supplied to the workpiece and a reference hole. Through the reference hole, the outer periphery of the pillar of a high-pressure water jet passes without contacting the inner wall of the reference hole penetratingly formed in the workpiece. A slit groove formation position is aligned with a pillar formation position on a slit groove formation surface of the workpiece by relatively shifting the pillar of a high-pressure water jet to the workpiece based on data of a coordinates using the reference position as the origin of the coordinates. The slit grooves are formed in the workpiece by supplying the pillar of a high-pressure water jet onto the slit groove formation position on a slit groove formation surface of the workpiece while irradiating and scanning a laser beam into the pillar of a high-pressure water jet many times along the slit groove formation position.

According to the present invention, the pillar of a high-pressure water jet is formed and the laser beam is irradiated onto the workpiece while irradiating the laser beam in the pillar of a high-pressure water jet. On forming the slit grooves using such a water jet laser, the relative position between the workpiece and the pillar is determined as the reference position when the entire of the outer periphery of the pillar passes through the reference hole which is formed in advance in the workpiece. Following, the slit groove formation position is aligned with the pillar formation position on the workpiece by relatively shifting the pillar on the workpiece based on the coordinate data in which the reference position is used as the origin of the coordinates. That is, according to the present invention, before initiating the slit groove formation in the workpiece, the reference hole is formed in advance in the workpiece, through which the entire periphery of the pillar of a high-pressure water jet can pass without contacting the wall and opening edge parts of the reference hole. The reference position is determined as the origin for the relative position between the workpiece and the pillar of a high-pressure water jet by passing the pillar through the reference hole. The method according to the present invention can easily determine the reference position when compared with the related art techniques using a camera and the like.

Still further, according to the present invention, when the pillar of a high-pressure water jet does not completely pass the reference hole, the pillar is reflected by the inner wall part or the opening edge part of the reference hole. It is thereby possible to recognize whether or not the pillar passes through the reference hole by visual inspection. This enables an operator to correctly determine the reference position with high accuracy.

Based on the reference hole which is correctly determined with high accuracy, it is possible to align the slit groove formation position with the pillar formation position and with the laser beam irradiation position through the pillar of a high-pressure water jet with high accuracy, and further possible to form the slit grooves in the workpiece with high accuracy.

According to the present invention, it is possible to control an error between the pillar formation position and the laser beam irradiation position passing through the pillar of a high-pressure water jet corresponding to the slit groove formation position for the slit groove formation position. This can avoid the occurrence of fluctuation in width and steps of the slit grooves. The present invention provides the molding die having the slit grooves formed with high accuracy through which the honeycomb structure body is extruded.

In the method of producing the molding die as another aspect of the present invention, the reference position is determined before initiating the laser beam scanning for forming the slit grooves in the slit groove formation surface of the workpiece, and when the laser beam scanning is halted during the slit groove formation in the workpiece, the reference position is determined again, and the laser beam scanning for irradiating the laser beam to the slit groove formation position in the workpiece is restarted after the pillar of a high-pressure water jet is returned to the position of the workpiece at which the laser beam scanning is halted based on the data of the coordinates having the newly obtained reference position as the origin. That is, it is preferable to carry out the determination of the reference position in the workpiece before initiating the laser beam scanning.

As described above, the recent trend needs to decrease the width of the slit groove in the molding die as narrow as possible. In order to achieve the recent demand, it is necessary to carry out the slit groove formation in the workpiece with high accuracy. However, this requires a long period of time for carrying out the slit groove formation, and therefore possibility of replacing a faulty part in a slit groove formation system (equipped with a water jet laser apparatus or a laser machining apparatus capable of forming the slit grooves in the workpiece) with new one.

Because the replacing of the faulty part needs to halt the laser beam scanning, it is preferable to restart the laser beam scanning onto the workpiece after the reference position is re-determined again. That is, it is possible to correctly return the relative position between the workpiece and the pillar of a high-pressure water jet to the origin by re-determining the reference position after the laser beam scanning is halted. It is thereby possible to relatively shift the pillar to the position on the workpiece at which the laser beam scanning is halted, and to accurately re-start the laser beam scanning at the position where the laser beam scanning is halted. Accordingly, even if the laser beam scanning is halted, it is possible to control the position error between the pillar formation position relatively corresponding to the slit groove formation position and the laser beam scanning position. It is further possible to prevent occurrence of variations in width and step of the slit grooves formed in the workpiece.

In the method of producing the molding die as another aspect of the present invention, it is preferable to form the reference hole in an outside area of the slit groove formation area in the workpiece. This configuration can escape from the influence caused by the presence of the reference hole during forming the slit grooves in the workpiece. When ceramic raw material is extruded and molded using the molding die according to the present invention, this configuration can escape from the bad influence to be caused by the reference hole during the slit groove formation. It is preferably to form the reference hole at the outside area of the feed hole formation area in which the feed holes are communicated with the slit grooves. This configuration can escape from the influence caused by the presence of the reference hole during forming the feed holes in the workpiece. This configuration can further escape from the bad influence caused by the presence of the reference hole during forming honeycomb structure bodies using the molding die of the present invention.

In the method of producing the molding die as another aspect of the present invention, the reference hole is formed in a reference hole formation member other than the workpiece, and the reference hole formation member is assembled into the workpiece. This case can form the reference hole with more high accuracy when compared with the case where the reference hole is directly formed in the workpiece. Because the reference hole is formed in the reference hole formation member which is different from the workpiece, it is possible to easily handle the reference hole. For example, this can easily and precisely adjust the position of the reference hole.

In the method of producing the molding die as another aspect of the present invention, the pillar of a high-pressure water jet is supplied from a nozzle part having an outlet hole onto the workpiece, and the reference hole formation member is a supplemental nozzle part having an outlet hole for use as the reference hole to be assembled in the workpiece, and having a same shape of the nozzle part through which the pillar of a high-pressure water jet is supplied onto the workpiece. This case enables that one of plural nozzle parts which are supplementary prepared in advance is used as the reference hole formation member. Because the outlet hole in the selected nozzle part is used as the reference hole, it is possible to easily form the reference hole in the workpiece by assembling the selected nozzle part into the workpiece. Further, the selected nozzle part is a part to form the pillar of a high-pressure water jet by passing a high pressure water to the outlet hole in the nozzle part. By using the outlet hole in the nozzle part as the reference hole, it is possible to carry out the determination of the reference position in the workpiece by passing the pillar of a high-pressure water jet into the outlet hole of the nozzle part assembled into the workpiece. It is therefore possible to determine the reference position in the workpiece with more high precisely and accuracy.

In the method of producing the molding die as another aspect of the present invention, the workpiece has an engagement penetration hole, whose shape corresponds to an outer shape of the supplemental nozzle part. The engagement penetration hole fits the supplemental nozzle part, and the workpiece and the supplemental nozzle part is one assembled body. This configuration can easily form the reference hole in the workpiece only by fitting the supplemental nozzle part in the penetration hole formed in the workpiece.

In the method of producing the molding die as another aspect of the present invention, an opening diameter A of the reference hole and an outer diameter B of the pillar of a high-pressure water jet satisfy a following relationship: B<=A<=1.5B.

If the relationship is A<=B, because it is impossible to pass the entire of the outer periphery of the pillar of a high-pressure water jet into the reference hole, there is a possibility of not determining the reference position in the workpiece. On the contrary, when relationship is A>1.5B, there is a possibility of not precisely determining the reference hole in the workpiece because the opening diameter A of the reference hole is more larger than the outer diameter B of the pillar of a high-pressure water jet.

In the method of producing the molding die as another aspect of the present invention, the pillar of a high-pressure water jet to be supplied to the workpiece has the outer diameter B within a range of 30 μm to 200 μm. When the pillar formation position has such a small or narrow outer diameter, it must be carried out with more high precisely that the slit groove formation position is aligned with the pillar formation position. The method according to the present invention can efficiently perform such an alignment process and shows the remarkable effects thereof.

In the method of producing the molding die as another aspect of the present invention, a depth of each reference hole is larger than a depth of each slit groove finally formed in the molding die. According to the present invention, the reference hole is so formed that the entire of the outer periphery of the pillar of a high-pressure water jet passes through the reference hole without contacting the pillar of a high-pressure water jet to the wall and opening edge of the reference hole. It is thereby possible to keep the accuracy of the pillar formation position and the laser beam irradiation position in the workpiece until the depth of the reference hole. That is, it is possible to keep the accuracy of both the pillar formation position and the laser beam irradiation position until the depth of each slit groove which is finally formed in the workpiece. This can form the slit grooves in the workpiece with more high precisely.

In the method of producing the molding die as another aspect of the present invention, each slit groove formed in the slit groove formation surface of the molding die has a width within a range of 40 μm to 150 μm. To form the slit groove having such a narrow width in the workpiece needs to carry out the slit groove formation work with extremely high accuracy. The method according to the present invention can efficiently perform such a slit groove formation process and shows the remarkable effects thereof.

In the method of producing the molding die as another aspect of the present invention, each slit groove formed in the slit groove formation surface of the molding die has a depth within a range of 2.0 to 3.5 mm. To form the slit groove having such a depth in the workpiece needs to carry out the slit groove formation work with extremely high accuracy. The method according to the present invention can efficiently perform such a slit groove formation process and shows the remarkable effects thereof.

In the method of producing the molding die as another aspect of the present invention, the lattice shape of the slit grooves formed in the molding die as a final product is one of a triangle shape, a square shape, and a hexagonal shape. The method according to the present invention can efficiently perform such a slit groove formation process having such lattice shapes and shows the remarkable effects thereof. The shape of each slit groove is selectable according to the shape of the honeycomb structure body to be produce.

Still further, according to the present invention, it is possible to use metal, ceramics and other material of different sizes as the workpiece. For example, JIS (Japanese Industrial standard) SKD 61 (ASTM H13 as alloy tool steel) can be used as the workpiece of a plate shape.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1A:
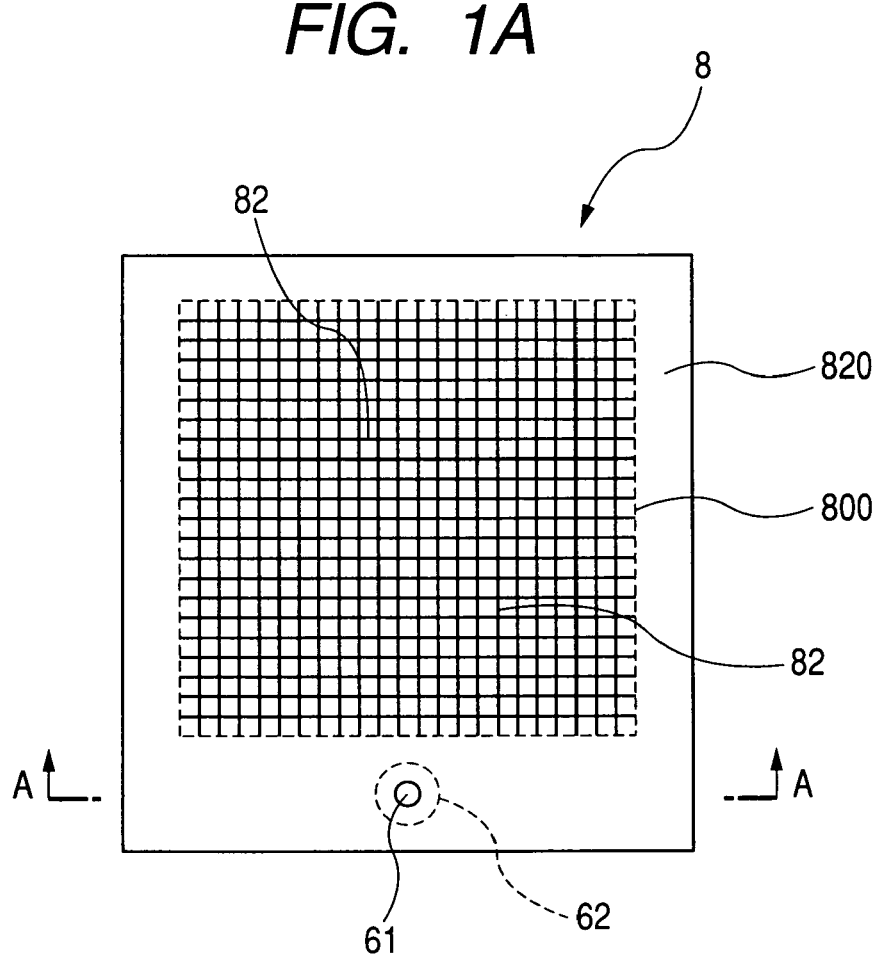
FIG. 1A is an explanation view of a slit groove formation surface of a workpiece (as a target die plate material) to be worked in the method of producing a molding die according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the method of producing a molding die for use in producing, such as extruding and molding, honeycomb structure bodies made of ceramic material according to the first embodiment of the present invention with reference to FIGS. 1A and 1B to FIG. 8.

Figure 1B:
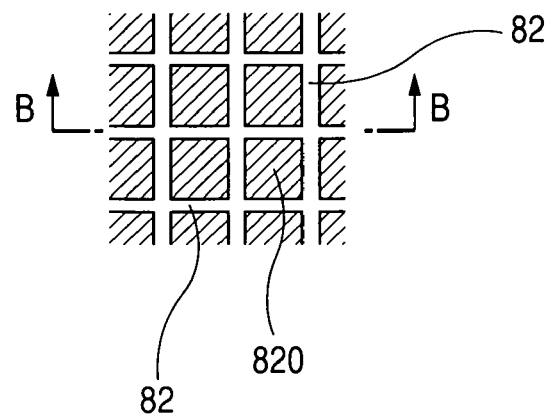
FIG. 1B is an enlarged view of a part in the slit groove formation surface in the workpiece shown in FIG. 1A.
Figure 2:
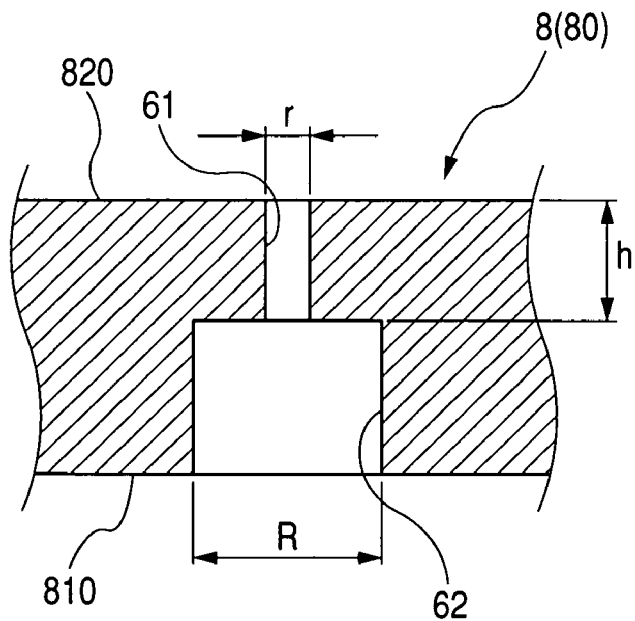
FIG. 2 is a sectional view of the slit groove formation surface of the workpiece (or a molding die) along the A-A line designated by arrows shown in FIG. 1A.
Figure 3:
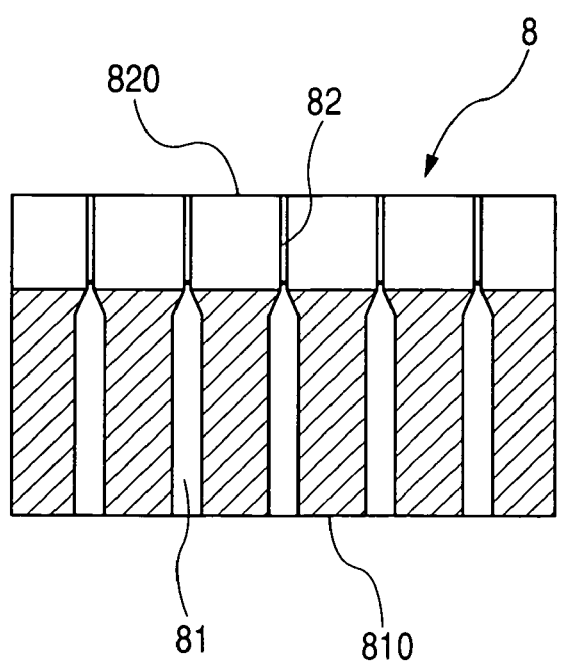
FIG. 3 is a sectional view of the slit groove formation surface of the workpiece along the B-B line designated by arrows shown in FIG. 1B.

FIG. 1A is an explanation view of a slit groove formation surface 820 of a workpiece as a target die plate material, with which the molding die 8 for use in producing honeycomb structure bodies is produced by the method according to the present invention. FIG. 1B is an enlarged view of the slit groove formation surface 820 in the workpiece shown in FIG. 1A. FIG. 2 is a sectional view of the slit groove formation surface 820 of the workpiece along the A-A line designated by arrows shown in FIG. 1A. FIG. 3 is a sectional view of the slit groove formation surface 820 of the workpiece along the B-B line designated by arrows shown in FIG. 1B.

As shown in FIG. 1A and FIG. 3, a plurality of feed holes 81 and a plurality of slit grooves 82 are formed in a lattice or grid arrangement in the molding die 8. Raw material such as ceramic material is supplied through the feed holes 81. The raw material is then extruded and molded through the slit grooves 82 communicated with the feed holes 81. The feed holes 81 are formed in a feed hole formation surface 810, and on the contrary, the slit grooves 82 are formed in a slit groove formation surface 820 of the molding die 8. Both the feed hole formation surface 810 and the slit groove formation surface 820 are formed in a working area (as a slit groove formation area) 800 of the workpiece 80.

The slit grooves 82 are formed in a lattice or grid arrangement, in which each slit groove 82 has 90 µm width, and 2.5 mm depth. However, the method according to the present invention is applicable to various cases of producing the molding die having slit grooves in a lattice or grid arrangement in which each lattice has a triangle shape, a hexagonal shape, and the like, for example.

As shown in FIG. 1 and FIG. 2, the die material has a reference hole 61 through which the pillar of a high-pressure water jet is passing during alignment. The reference hole 61 is formed in the outside area of the working area 800 in the workpiece. The reference hole 61 will be explained in detail later. The reference hole 61 has a cylindrical shape formed in the slit groove formation surface 820 side of the workpiece. The reference hole 61 is communicated with an escape hole 62 formed in the feed hole formation surface 810 side. The escape hole 62 is capable of escaping the pillar of a high-pressure water jet passing through the reference hole 61. The escape hole 62 has a large diameter rather than that of the reference hole 61, as shown in FIG. 2.

The reference hole 61 is so formed that the outer periphery of the pillar of a high-pressure water jet can pass through it. In the first embodiment, the opening diameter of the reference hole 61 is 55 µm which is same in magnitude as an inner diameter r thereof. The reference hole 61 has a depth of 5.0 mm. On the contrary, the escape hole 62 has the inner diameter R of 10.0 mm.

Figure 4:
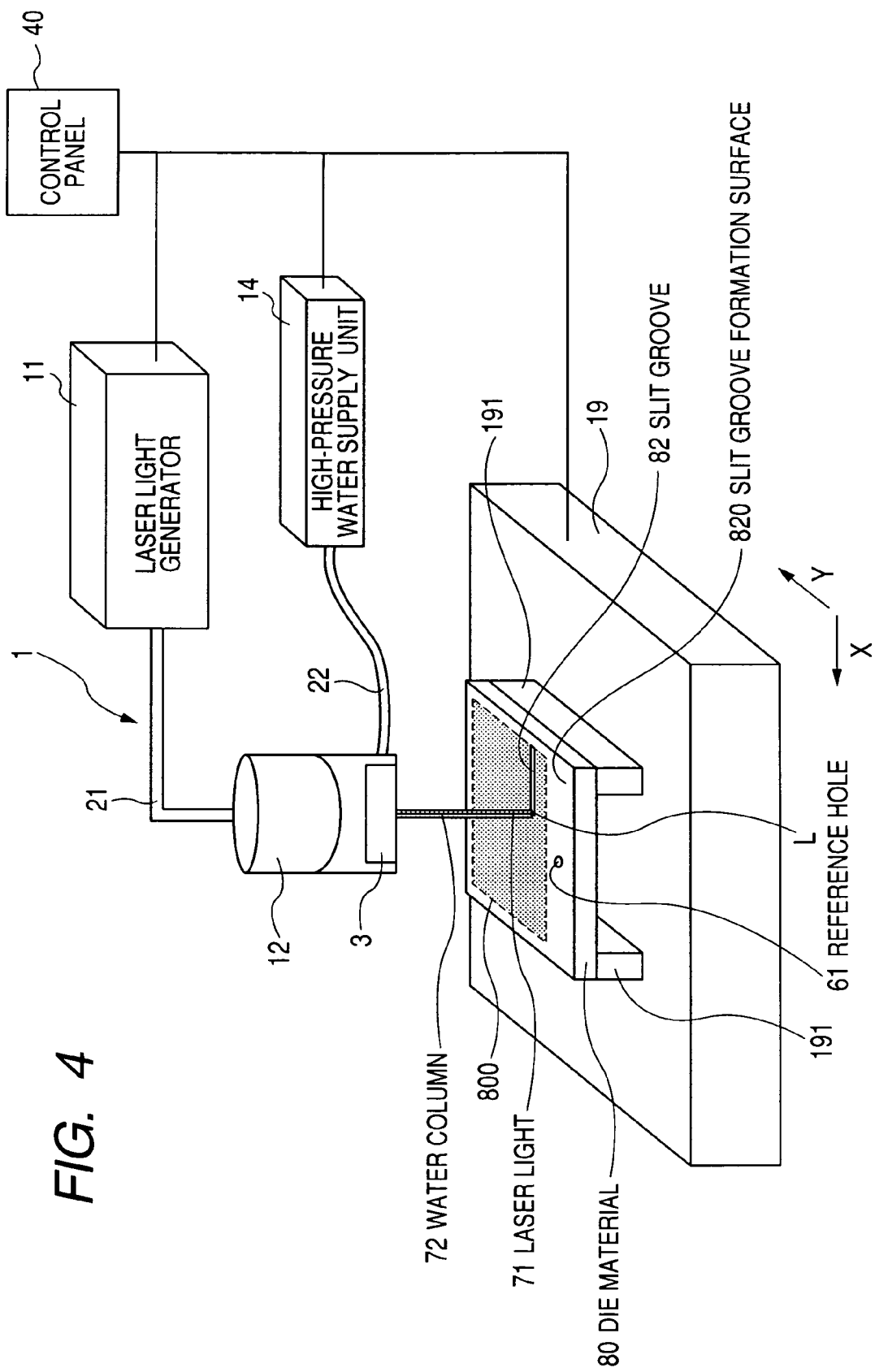
FIG. 4 is an explanation view showing a slit groove formation process in the method according to the first embodiment of the present invention, performed by a slit groove formation system equipped with a water jet laser apparatus (or a laser machining apparatus) capable of forming slit grooves in the workpiece.

FIG. 4 is an explanation view showing the slit groove formation process in the method according to the present invention performed by a slit groove formation system 1. The slit groove formation system 1 is equipped with a water jet laser apparatus (or a laser machining apparatus) capable of forming slit grooves in the workpiece.

The method of producing the molding die according to the first embodiment uses the slit groove formation system 1 equipped with the water jet laser apparatus, shown in FIG. 4. The water jet laser apparatus in the slit groove formation system 1 is comprised of a laser generating portion 11, a laser head 12, a nozzle 3, a high-pressure water supply portion 14, and the like. The laser generating portion 11 generates a laser light 71. Through the laser head 12, the laser beam 71 is irradiated to the workpiece 80 as the die plate material made of metal such as alloy tool steel.

The nozzle 3 jets the pillar 72 of a high-pressure water jet onto the workpiece. The high-pressure water supply portion 14 supplies the high pressure water to the laser head 12 in order to make the pillar 72 of a high-pressure water jet. The laser head 12 and the nozzle 3 are one assembled body.

Figure 5:
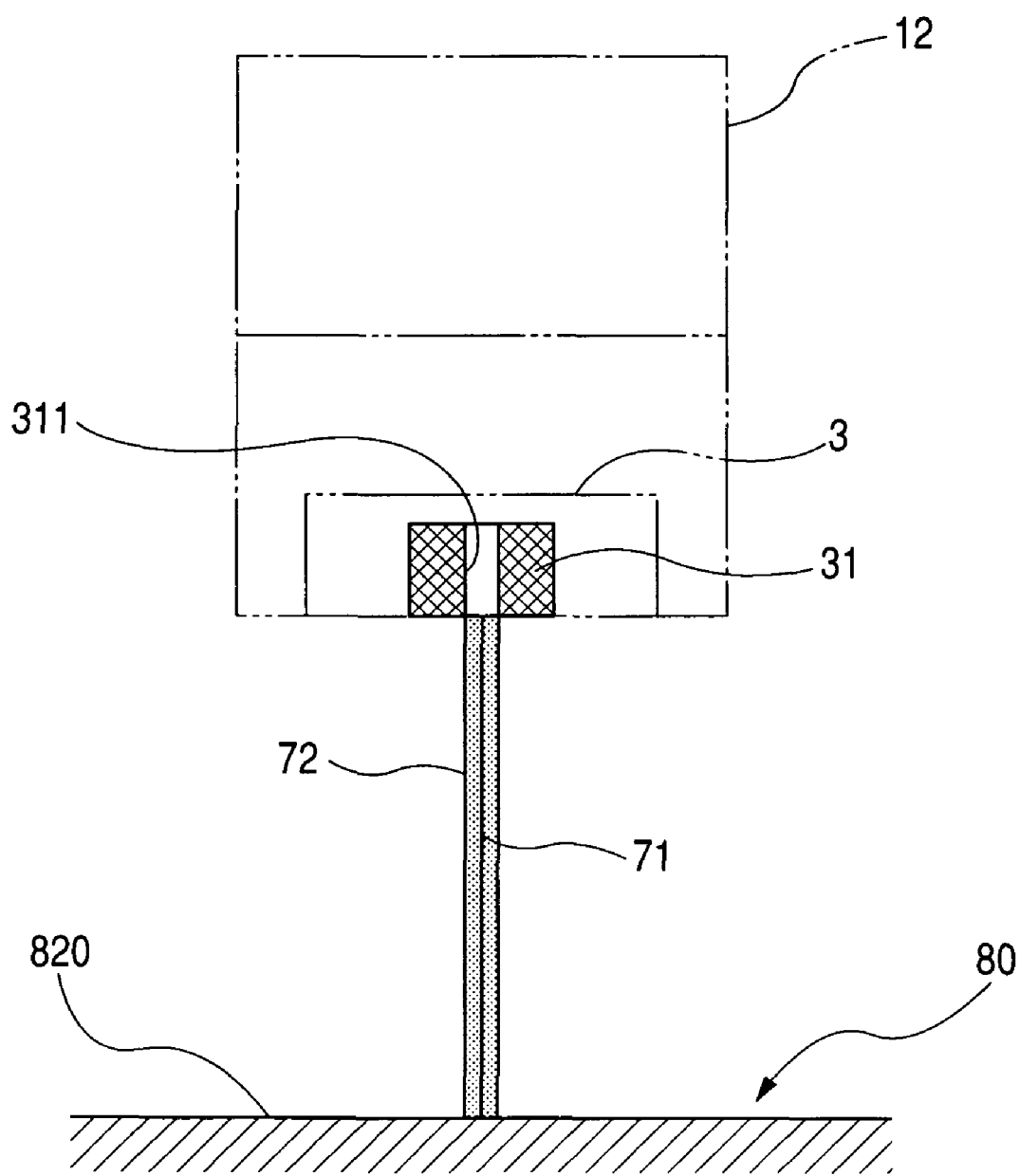
FIG. 5 is an explanation view of a nozzle in the water jet laser apparatus in the slit groove formation system shown in FIG. 4.

FIG. 5 is an explanation view of the nozzle 3 in the water jet laser apparatus in the slit groove formation system 1 which is used in the method according to the present invention.

As shown in FIG. 5, the nozzle 3 is equipped with a nozzle part 31 having an outlet hole 311 for producing the pillar 72 of a high-pressure water jet by passing a high-pressure water supplied from the high-pressure water supply portion 14. When the high-pressure water is supplied to the outlet hole 311 in the nozzle part 31, the outlet hole 311 provides the pillar 72 of a high-pressure water jet to the outside. The inner diameter r of the outlet hole 311 is 55 µm.

As shown in FIG. 4, an optical fiber portion 21 is disposed between the laser generating portion 11 and the laser head 12. A laser beam is transmitted from the laser generating portion 11 to the laser head 12 through the optical fiber portion 21.

A water pipe portion 22 is disposed between the high-pressure water supply portion 14 and the nozzle 3, through which the high-pressure water is supplied to the nozzle 3. As shown in FIG. 4, the slit groove formation system 1 has a holder portion (or a bed) 19 which supports and holds the workpiece 80 (as the metal plate material 80 made of metal which will be explained later). The holder portion 19 is movable in X axis direction and Y axis direction (see FIG. 1 and FIG. 4, for example). The holder portion 19 is equipped with a driving unit (not shown) capable of moving the holder portion 19.

The slit groove formation system 1 further has a control panel 40 (or an operation panel). The control panel 40 is electrically connected to the driving unit (not shown) in the holder portion 19, the high-pressure water supply portion 14, and the laser generating portion 11.

An operator handles the control panel 40 to control and operate the laser generating portion 11, the high-pressure water supply portion 14, the holder portion 19, and the like in the slit groove formation device 1.

Further, as shown in FIG. 4, a square shaped metal plate of 200 mm length, 200 mm width, and 15 mm thickness is used as the workpiece 80 in order to produce the molding die 8. For example, the workpiece 80 of a plate shape is made of JIS (Japanese Industrial standard) SKD 61 (ASTM H13 as alloy tool steel). It is possible to use different material of different sizes as the workpiece instead of SKD61.

Next, a description will now be given of the method of producing the molding die 8, as one concrete example, according to the first embodiment of the present invention.

At first, a plurality of feed holes 81 (see FIG. 3) is formed in the feed hole formation surface 810 of the workpiece 80 using a drill.

The feed holes 81 are so formed that each feed hole 81 has a depth which does not penetrate the workpiece 80. The feed holes 81 are formed within the working area 800 in the workpiece 80.

Following, the reference hole 61 (see FIG. 2) is formed in the workpiece 80. The reference hole 61 is used for aligning the slit groove formation position with the formation position of the pillar of a high-pressure water jet.

As shown in FIG. 2, the escape hole 62 is firstly formed in the feed hole formation surface 810 of the workpiece 80 toward the slit groove formation surface 820 side. The escape hole 62 has a large diameter than that of the reference hole 61.

After completion of the formation of the escape hole 62, the reference hole 61 is formed in the slit groove formation surface 820 using the drill so that the reference hole 61 is communicated with the escape hole 62. In particular, it is so formed that the reference hole 61 has the diameter through which the pillar 72 of a high-pressure water jet can pass. The reference hole 61 is formed in the outside area of the working area 800 in the workpiece 80.

Next, the slit grooves 82 (shown in FIG. 1 and FIG. 3) are formed on the slit groove formation surface 820 of the workpiece 80.

Figure 6:
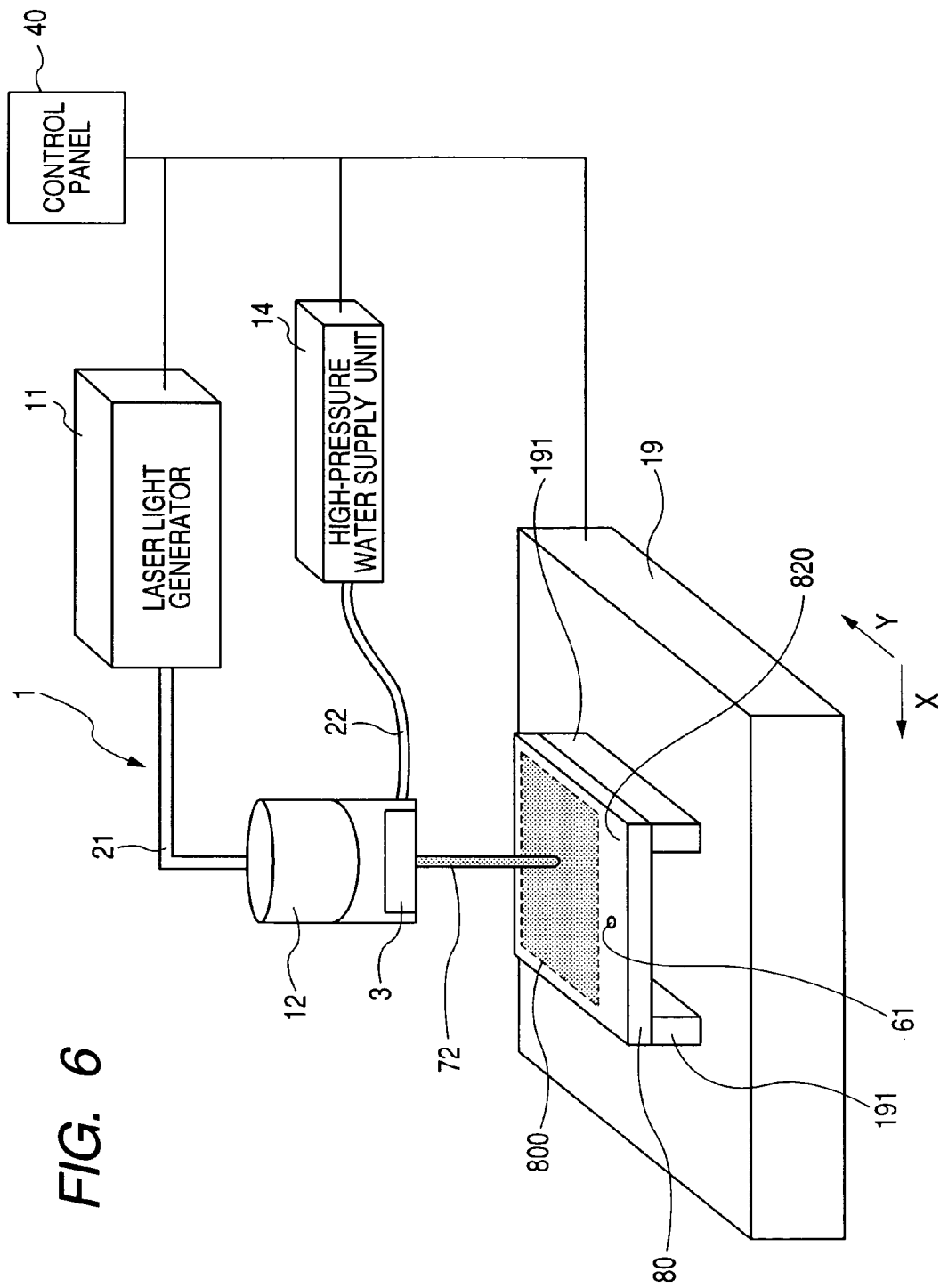
FIG. 6 is an explanation view of the slit groove formation process in the method according to the first embodiment of the present invention, performed by the slit groove formation system equipped with the water jet laser apparatus capable of forming slit grooves in the workpiece, where a pillar of a high-pressure water jet is supplied onto the workpiece.

FIG. 6 is an explanation view of the slit groove formation process in the method according to the present invention, which is performed by the slit groove formation system 1 equipped with the water jet laser apparatus, where the pillar 72 of a high-pressure water jet is supplied onto the workpiece 80.

First, as shown in FIG. 6, the workpiece 80 as the die plate material is supported and held on the holder portion 19 in the groove formation device 1 equipped with the water jet laser apparatus. At this time, spacers 191 are placed between the holder portion 19 and the workpiece 80 in order to keep a space. The high-pressure water supply portion 14 in the water jet laser apparatus of the slit groove formation system 1 then supplies the high-pressure water and the nozzle 3 provides the pillar 72 of a high-pressure water jet to the workpiece 80. In the first embodiment, the pillar 72 of a high-pressure water jet has a diameter of 53 μm.

Figure 7:
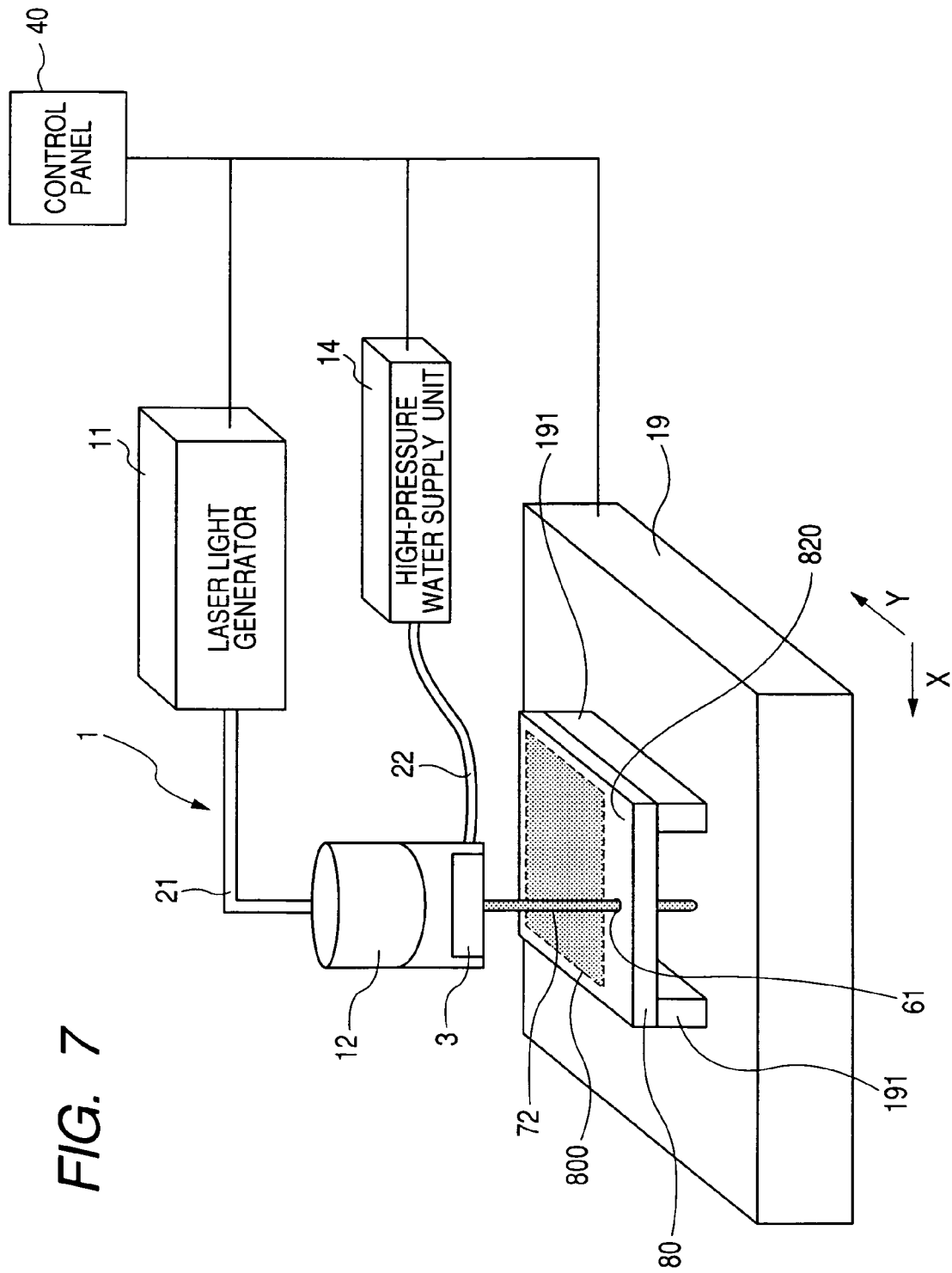
FIG. 7 is an explanation view of the slit groove formation process in the method according to the first embodiment of the present invention, performed by the slit groove formation system equipped with the water jet laser apparatus capable of forming slit grooves in the workpiece, where the pillar of a high pressure water jet is passing through a reference hole formed in the workpiece.

FIG. 7 is an explanation view of the slit groove formation process in the method according to the present invention, which is performed by the slit groove formation system 1 equipped with the water jet laser apparatus, where the pillar 72 of a high pressure water jet is passing through a reference hole formed in the workpiece 80.

As shown in FIG. 7, the holder portion 19 is so shifted in X axis direction and Y axis direction that the entire of the outer periphery of the pillar 72 can pass through the reference hole 61 formed in the workpiece 80. The shifting of the holder portion 19 is completed at the position where the entire of the outer periphery of the pillar 72 passes through the reference hole 61. This position is determined as a reference position S which is a relative position between the workpiece 80 and the pillar 72.

During the process for determining the reference position S, an operator must recognize by visual inspection that the entire of the outer periphery of the pillar 72 of a high-pressure water jet passes through the workpiece 80 without contacting any part of the workpiece 80, and the pillar 72 of a high-pressure water jet is passing through the feed hole formation surface 810 of the workpiece 80 without disorder.

Following, as shown in FIG. 4, the holder portion 19 is shifted in X axis direction and Y axis direction according to coordinate data items where the origin thereof is set to the reference position S in order to align the slit groove formation position and the pillar formation position of the pillar 72 of a high-pressure water jet on the workpiece 80. The laser generating portion 11 then generates and irradiates the laser beam 71 to the slit groove formation position on the workpiece 80 through the pillar 72 of a high-pressure water jet. At this time, the laser irradiation position L of the laser beam 71 is moved along the slit groove formation position by shifting the holder portion 19 in X axis direction and Y axis direction, where the laser beam is repeatedly shifted several times on the same slit groove formation position.

During the laser beam irradiation in the method of the first embodiment, the pillar 72 of a high-pressure water jet is formed using a high-pressure water of 230 kgf/cm$^2$ and the laser beam of a pulse power of 1400 Watts. The moving speed of the laser irradiation position L to the workpiece 80 is within a range of 150 to 240 mm/minutes, and the number of repetition of the irradiation is 70 times. As a result, the slit grooves 82 having the width of 90 μm and the depth of 2.5 mm are formed on the workpiece 80 as the molding die 8. The method of producing the molding die 8 according to the first embodiment is thereby completed.

Because the method of the first embodiment according to the present invention must perform the slit groove formation process of making each slit groove of a narrow width with high accuracy for a long period of time, there is a possibility of breaking the scanning of the laser beam onto the workpiece 80 in order to replace a faulty part in the slit groove formation system 1 with a new one. In this case, the laser beam scanning is re-started after the reference position S is re-determined by the same manner described above. That is, as shown in FIG. 6, the pillar 72 of a high-pressure water jet is generated and supplied to the workpiece 80 in order to re-determine the reference position S, and the holder portion 19 is shifted until the position at which the entire of the outer periphery of the pillar 72 completely passes through the reference hole 61 without contacting the inner wall surface and the opening edges thereof. Based on the coordinate data items in which the reference position S is the origin of the coordinate, the pillar formation position of the pillar 72 of a high-pressure water jet is shifted to the position at which the laser beam scanning is halted, and the laser beam scanning is then initiated, as shown in FIG. 7.

Next, a description will now be given of the action and effect of the method of producing the molding die 8 according to the first embodiment of the present invention.

The method according to the first embodiment makes the slit grooves 82 on the workpiece 80 while the pillar 72 of a high-pressure water jet is supplied and the laser beam 71 is irradiated into the pillar 72 of a high-pressure water jet. That is, the slit grooves 82 are formed in the workpiece 80 by the water jet laser slitter or cutting manner. In particular, the entire of the outer periphery of the pillar 72 of a high-pressure water jet passes through the reference hole 61 which is formed in advance in the workpiece 80 as the die plate material made of metal, and the relative position between the workpiece 80 and the pillar 72 of a high-pressure water jet is determined as the reference position S. After the determination of the reference position S, the pillar 72 of a high-pressure water jet is relatively shifted to the workpiece 80 based on the coordinate data items having the reference position S as the origin of the coordinate in order to align the slit groove formation position with the pillar formation position. In other words, before the formation of the slit grooves 82 in the workpiece 80, the reference hole 61 is formed in advance in the workpiece 80, where the reference hole 61 has a diameter through which the entire of the outer periphery of the pillar 72 of a high-pressure water jet is completely passing without contacting the inner wall and opening edges of the reference hole 61. The reference position S as the origin of the relative shifting between the workpiece 80 and the pillar 72 is determined while the pillar 72 of a high-pressure water jet is passing through the reference hole 61 of the workpiece 80. It is therefore possible to easily perform the determination of the reference position S with a simple step when compared with the related art technique using the image data photographed by a camera.

According to the method of producing the molding die 8 of the first embodiment, the pillar 72 of a high-pressure water jet is spattering if the pillar 72 contacts the opening edge or the inner wall of the reference hole 61 and the pillar 72 is spattering under a bad alignment condition between the workpiece 80 and the pillar 72 of a high pressure water jet. An operator can easily recognize this phenomenon with a visual inspection. It is therefore possible to determine the reference position S with high accuracy.

Further, according to the method of the first embodiment, because the pillar 72 of a high-pressure water jet is relatively shifted to the workpiece 80 (namely, the workpiece 80 is shifted by the driving unit (not shown) to the pillar 72 of a high-pressure water jet) based on the reference position S determined with high accuracy, it is possible to align the pillar formation position and with the irradiation position of the laser beam 71 to be passing through the pillar 72 of a high-pressure water jet on the slit groove position on the workpiece 80.

The method according to the first embodiment of the present invention can form the slit grooves 82 in the workpiece 80 as the molding die 8 with high accuracy.

Still further, according to the method of the first embodiment of the present invention, if the laser beam scanning is halted in order to replace a part which is consumed or a faulty part in the slit groove formation system 1 with new one, the laser beam scanning is restarted after the reference position S is re-determined. It is thereby possible to precisely return the relative position between the workpiece 80 and the pillar formation position of the pillar 72 of a high-pressure water jet to the original position by performing the re-determination of the reference position S. This enables the pillar 72 of a high-pressure water jet to be returned with high accuracy to the position at which the laser beam scanning is halted, and the cutting process for the slit grooves 82 can be restarted with high accuracy from this point at the interruption of the laser beam scanning.

Thus, even if the laser beam scanning is interrupted during a long working process, it is possible to suppress the occurrence of any positioning error between the pillar formation position to the slit groove formation position in the workpiece 80 and the irradiation position of the laser beam 71. Further, it is possible to avoid the occurrence of variations in width and steps of the slit grooves formed in the workpiece 80.

Still further, according to the method of the present invention, the reference hole 61 is formed in the outside area of the working area 800 in which the feed holes 81 and the slit grooves 82 are formed in the workpiece 80. It is thereby possible to escape from the bad influence caused by the presence of the reference hole during the formation of the feed holes 81 and the slit grooves 82 in the workpiece 80.

According to the method of the present invention, it is further possible to escape from the bad influence caused by the presence of the reference hole during the production of honeycomb structure bodies using the molding die 8 which is produced by the method according to the present invention.

The depth h of the reference hole 61 is not less than that of each slit groove 82 finally formed in the molding die 8. It is therefore possible to keep the accuracy of both the pillar formation position for the pillar 72 of high-pressure water jet and the irradiation position for the laser beam 71 until the depth of the reference hole 61. That is, it is possible to keep the accuracy of both the pillar formation position for the pillar 72 of high-pressure water jet and the irradiation position for the laser beam 71 until the slit groove depth finally formed in the molding die 8. This enables the slit grooves to be formed in the workpiece 80 (or the molding die 8 as a final product) with more high accuracy.

According to the method of producing the molding die described above in detail, it is possible to suppress the occurrence of slipping or shifting the pillar formation position for the pillar 72 of high-pressure water jet from the irradiation position for the laser beam 71 in the workpiece 80. Further, it is possible to avoid the occurrence of variations in width and steps of the slit grooves 82 formed in the molding die 8. The method according to the present invention produces the molding die 8, for use in producing honeycomb structure bodies, having the slit grooves 82 formed therein with high accuracy.

Modification Example

Figure 8:
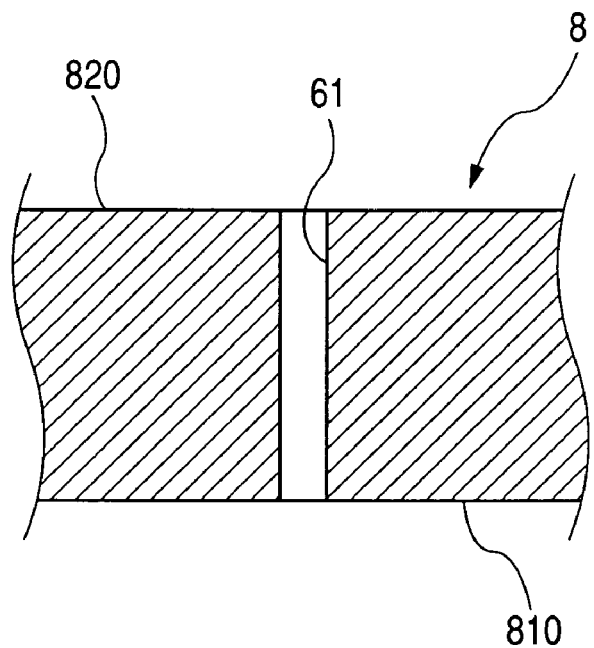
FIG. 8 is an explanation view of the reference hole and its peripheral configuration in the workpiece to be worked in the method according to the first embodiment of the present invention.

FIG. 8 is an explanation view of the reference hole and its peripheral configuration in the workpiece to be worked in the method according to the first embodiment of the present invention.

In the method according to the first embodiment of the present invention described above, although the reference hole 61 is so formed in the slit groove formation surface 820 of the workpiece 80 that it communicates with the escape hole 62 whose diameter is larger than that of the reference hole 61. The present invention is not limited by this configuration, for example, it is possible to form only the reference hole 61 which penetrates the workpiece 80 without forming the escape hole 62. This configuration can also achieve the same effect.

As shown in FIG. 3 and FIG. 8, although the reference hole 61 has a same diameter along its depth direction, it is possible for the reference hole 61 to have a taper shape or a shape in which the middle part thereof has a smaller diameter, when compared with that of the remaining part, unless the reference hole 61 has an opening diameter through which the pillar 72 of a high-pressure water jet supplied from the nozzle 3 passes without contacting the inner wall and opening edge of the reference hole 61.

Second Embodiment

A description will be given of the method of producing the molding die for producing (such as extruding and molding) honeycomb structure bodies made of ceramic material according to the second embodiment of the present invention with reference to FIG. 9.

Figure 9:
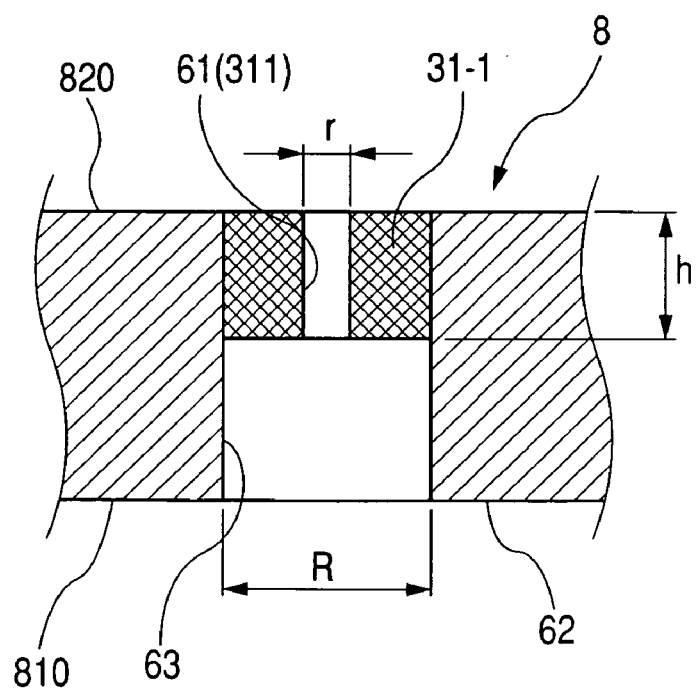
FIG. 9 is an explanation view of a reference hole formed in a supplemental nozzle part and its peripheral configuration in the workpiece to be worked in the method according to a second embodiment of the present invention.

FIG. 9 is an explanation view of a reference hole 61 formed in a supplemental nozzle part 31-1 (as a reference hole formation member) and its peripheral configuration in the workpiece 80 to be worked in the method according to the second embodiment of the present invention. As shown in FIG. 9, an engagement penetration hole 63 is formed in the workpiece 80 instead of the reference hole 61. The diameter of the engagement penetration hole 63 corresponds to that of the outer periphery of the nozzle part 31 shown in FIG. 5. A supplemental nozzle part 31-1 mutually engages the engagement penetration hole 63 so that the supplemental nozzle part 31-1, the engagement penetration hole 63, and the slit groove formation surface 820 of the workpiece 80 form a flat surface.

The remaining part other than nozzle part 31 in the engagement penetration hole 63 becomes the escape hole 62 whose diameter is larger than that of the reference hole 61.

The inner diameter r of the reference hole 61 is 55 μm which is the same as the inner diameter of the outlet hole 311 in the nozzle part 31. The depth h of the reference hole 61 is 5 mm, which is the same as the length of the nozzle part 31. The inner diameter R of the escape hole 62 is 10 mm which is the same as that of the engagement penetration hole 63, as shown in FIG. 9.

Other components of the slit groove formation system equipped with the water jet laser apparatus (or a laser machining apparatus) capable of forming slit grooves in the workpiece according to the second embodiment are the same as those of the first embodiment.

In the method according to the second embodiment of the present invention, the engagement penetration hole 63 corresponding to the outer periphery shape of the supplemental nozzle part 31-1 is so formed in advance that the engagement penetration hole 63 penetrates through both the surfaces, namely, the feed hole formation surface 810 and the slit groove formation surface 820 of the workpiece 80. After this, the supplemental nozzle part 31-1 is fit to the engagement penetration hole 63. At this time, it is so formed that the supplemental nozzle part 31-1 and the slit groove formation surface 820 form a flat surface. The outlet hole 311 of the supplemental nozzle part 31-1 becomes the reference hole 61. Other steps of the method according to the second embodiment are the same as those of the first embodiment.

According to the second embodiment, it is possible to easily form the reference hole 61 in the workpiece 80 only by using the outlet hole 311 in the supplemental nozzle part 31-1 after the supplemental nozzle part 31-1 is joined into the engagement penetration hole 63 formed in the workpiece 80.

Because the reference hole 61 is formed in the supplemental nozzle part 31-1 as a different part from the workpiece 80, it is possible to easily handle the reference hole 61. For example, in order to change or adjust the dimension of the reference hole 61 in the workpiece, it is possible to select the nozzle part having the optimum inner diameter of the reference hole from plural nozzle parts having a different inner diameter of the reference hole which are prepared in advance.

Still further, because the nozzle part 31 is capable of generating the pillar 72 of a high-pressure water jet by passing a high-pressure water jet through the outlet hole 311, the reference position S is determined by passing the pillar 72 of a high-pressure water jet into the outlet hole 311, and it is possible to determine the reference position S with relatively high accuracy. Other effects of the method according to the second embodiment are the same as those of the method according to the first embodiment.

Still further, although the supplemental nozzle part 31-1 is used to form the optimum reference hole 61 in the workpiece to be used by the method according to the second embodiment, for example, it is possible to form the reference hole 61 in the workpiece 80 using a metal plate as another member from the workpiece, in which the reference hole is formed in advance, by mutually engaging the metal plate to the engagement penetration hole 63 of the workpiece 80.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A method of producing a molding die using a workpiece, for use in producing honeycomb structure bodies, in each of which a plurality of slit grooves and a plurality of feed holes communicating with the feed holes are formed in a lattice arrangement and a raw material of the honeycomb structure body is fed through the feed holes and molded in order to produce the honeycomb structure body having a honeycomb structure shape, the method comprising steps of:

determining a reference position as a relative position between a pillar of a high-pressure water jet to be supplied to the workpiece and a reference hole, which is penetratingly formed in the workpiece, through which the outer periphery of the pillar of a high-pressure water jet passes without contacting the inner wall of the reference hole, aligning a slit groove formation position with a pillar formation position on a slit groove formation surface of the workpiece by relatively shifting the pillar of a high-pressure water jet to the workpiece based on data of a coordinates using the reference position as the origin of the coordinates; and forming the slit grooves in the workpiece by supplying the pillar of a high-pressure water jet onto the slit groove formation position on a slit groove formation surface of the workpiece while irradiating and scanning a laser beam into the pillar of a high-pressure water jet many times along the slit groove formation position, wherein the reference hole is formed in a reference hole formation member other than the workpiece, and the reference hole formation member is assembled into the workpiece.

2. The method of producing a molding die according to claim 1, wherein the pillar of a high-pressure water jet is supplied from a nozzle part having an outlet hole onto the workpiece, and the reference hole formation member is a supplemental nozzle part having an outlet hole for use as the reference hole to be assembled in the workpiece, and having a same shape of the nozzle part through which the pillar of a high-pressure water jet is supplied onto the workpiece.

3. The method of producing a molding die according to claim 2, wherein the workpiece has an engagement penetration hole, whose shape corresponds to an outer shape of the supplemental nozzle part, fitting the supplemental nozzle part, and the workpiece and the supplemental nozzle part is one assembled body.

4. The method of producing a molding die according to claim 1, wherein an opening diameter A of the reference hole and an outer diameter B of the pillar of a high-pressure water jet satisfy a following relationship:

$$B<=A<=1.5B.$$

5. The method of producing a molding die according to claim 1, wherein the pillar of a high-pressure water jet to be supplied to the workpiece has the outer diameter B within a range of 30 μm to 200 μm.

6. The method of producing a molding die according to claim 1, wherein a depth of each reference hole is larger than a depth of each slit groove finally formed in the molding die.

7. The method of producing a molding die according to claim 1, wherein each slit groove formed in the slit groove formation surface of the molding die has a width within a range of a range of 40 μm to 150 μm.

8. The method of producing a molding die according to claim 1, wherein each slit groove formed in the slit groove formation surface of the molding die has a depth within a range of 2.0 to 3.5 mm.

9. The method of producing a molding die according to claim 1, wherein the lattice shape of the slit grooves formed in the molding die as a final product is one of a triangle shape, a square shape, and a hexagonal shape.

10. The method of producing a molding die according to claim 1, wherein the workpiece is made of one of an alloy tool steel and ceramics.

* * * * *